United States Patent

[11] 3,586,861

[72] Inventor Robert E. Wernikoff
 Belmont, Mass.
[21] Appl. No. 809,807
[22] Filed Mar. 24, 1969
[45] Patented June 22, 1971
[73] Assignee Electronic Image Systems Corporation
 Cambridge, Mass.

[54] LIGHT PEN COMPRISING SENSORS EACH
 SENSITIVE TO A DIFFERENT WAVELENGTH AND
 CORRESPONDING FILTERS ARRANGED TO
 SELECTIVELY PROVIDE BOTH LARGE AND
 SMALL EFFECTIVE APERTURES
 3 Claims, 2 Drawing Figs.
[52] U.S. Cl................................................. 250/217,
 250/226, 250/239
[51] Int. Cl........................................................ G06f 3/00,
 H01j 39/12
[50] Field of Search.......................................... 250/217
 CR, 226, 239

[56] References Cited
 UNITED STATES PATENTS
3,062,964 11/1962 Lubin............................ 250/239 X FOREIGN PATENTS
1,070,225 6/1967 Great Britain................ 250/217

Primary Examiner—James W. Lawrence
Assistant Examiner—T. N. Grigsby
Attorneys—Russell L. Root and Rines and Rines ABSTRACT: The disclosed light pen has a high resolution state and a low resolution state, either of which may be quickly and easily selected. When used to define locations on a cathode-ray tube display device, the low resolution state is particularly useful for erasing or other operations where a large area designation capability is preferable; the high resolution state is useful for pointing and other operations where it is desired to precisely define a location. The disclosed light pen is realized by incorporating plural sensing means each sensitive to a different wavelength of radiation and corresponding large and small areas subtending the aperture each of which transmits the wavelength to which a corresponding sensing means is sensitive. This facilitates electrically switching between a large effective aperture and a small effective aperture.

PATENTED JUN22 1971 3,586,861

INVENTOR.
ROBERT E. WERNIKOFF
BY
*Jamm E Hunn*

LIGHT PEN COMPRISING SENSORS EACH SENSITIVE TO A DIFFERENT WAVELENGTH AND CORRESPONDING FILTERS ARRANGED TO SELECTIVELY PROVIDE BOTH LARGE AND SMALL EFFECTIVE APERTURES

BACKGROUND

In computer-aided design systems and the like, light pens permit the user to position and manipulate objects displayed on the face of a cathode-ray tube display device. The variety of different light pens presently available all permit the user to precisely define the coordinates of a location on the display device, and in some operations this is quite useful, indeed even necessary. However, in operations such as erasing or modifying a displayed object, or adding shading to a predefined area, high resolution light pens require that the user define for the system each and every luminous point which he desires to modify in the display. This is at best a tedious process.

SUMMARY OF THE INVENTION

The invention provides a light pen having a variable resolution capability. It may be quickly and easily adjusted to view, and thereby to define for an associated system, either a point or a larger area on the face of the display device, as required by the operation being performed. While various structures could be devised to provide such a selectively variable resolution capability, preferably the light pen includes within a hollow housing a number of photoelectric elements, each element being sensitive to a different color of light. The elements are mounted to be illuminated only by light passing through correspondingly different color and size concentric filters covering an aperture of the housing. The pen may be adjusted to view an area of the appropriate size by selecting, either manually or automatically, the photosensitive element or elements whose corresponding filter or filters define an area of the desired size through the aperture.

BRIEF DESCRIPTION OF THE DRAWINGS

The preferred embodiment of the invention will be further described in connection with the accompanying drawings, in which.

DETAILED DESCRIPTION OF THE PREFERRED LIGHT PEN

Figure 1:
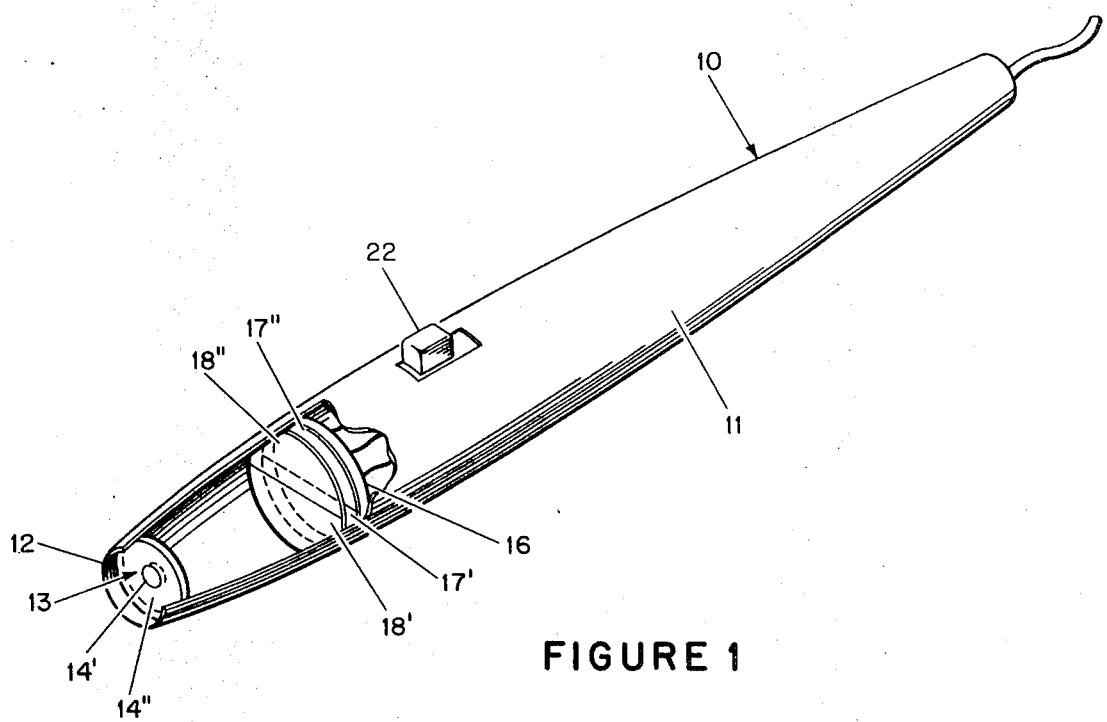
FIG. 1 is a perspective view of the preferred light pen with a portion of the housing broken away.

As shown in FIG. 1, the preferred construction of the light pen 10 includes a tubular housing 11 formed with an aperture defining opening 12 at one end. Covering this aperture is a filter 13 consisting of a plurality of concentric filter areas 14' and 14'', each area transmitting light of a different color. A sectioned photosensitive element 16, such as a Raysistor, is mounted within the housing to be illuminated by light passing through the aperture and filter areas. The photosensitive element includes electrically isolated semicircular photosensitive element areas 17' and 17''. These different element areas are covered by semicircular filter overlays 18' and 18'' which are transparent to the different colors of light transmitted by areas 14'' and 14'', respectively. The color transparency of the different size concentric areas 14' and 14'', and of semicircular filter overlays 18' and 18'', preferably are mutually exclusive; for example, filter area 14' and filter overlay 18' may be transparent to red light, while filter area 14'' and filter overlay 18'' may be transparent to green light. Thus, photosensitive element 17' will respond only to light passing through filter area 14' and 18' and photosensitive element 17'' will respond only to light passing through filter area 14'' and 18''. By virtue of this arrangement, photosensitive element 17' will view only the relatively small circular field defined by filter area 14', while photosensitive element 17'' will view the relatively large annular field defined by filter area 14''.

The photosensitive elements both may be connected by an output line 21 to a computer aided design control system, which may be programmed to automatically select either or both of the photosensitive elements, as is appropriate for the operation being performed. Even in such an arrangement, though, it is desirable to provide for manual selection of either or both photosensitive elements. To this end, the photosensitive elements are connected to the output line 21 through a switch 22 whose control button projects from the housing. Since the different concentric filter areas 14' and 14'' encompass progressively larger fields of view, by actuating the switch a viewing area of the desired circumferential size may be selected for viewing by the light pen. Since the concentric filter areas do not pass overlapping colors of light, the photosensitive element (or elements) responsive to light through the annular outer filter area (or areas) will have a central blind spot, and the electrical output of the element will momentarily drop out as a moving spot of light passes through the central area circumscribed by the annular filter. To prevent this electrical drop out, the output of the element viewing through the central filter area may be combined with the output of the element viewing through the outer annular area.

Figure 2:
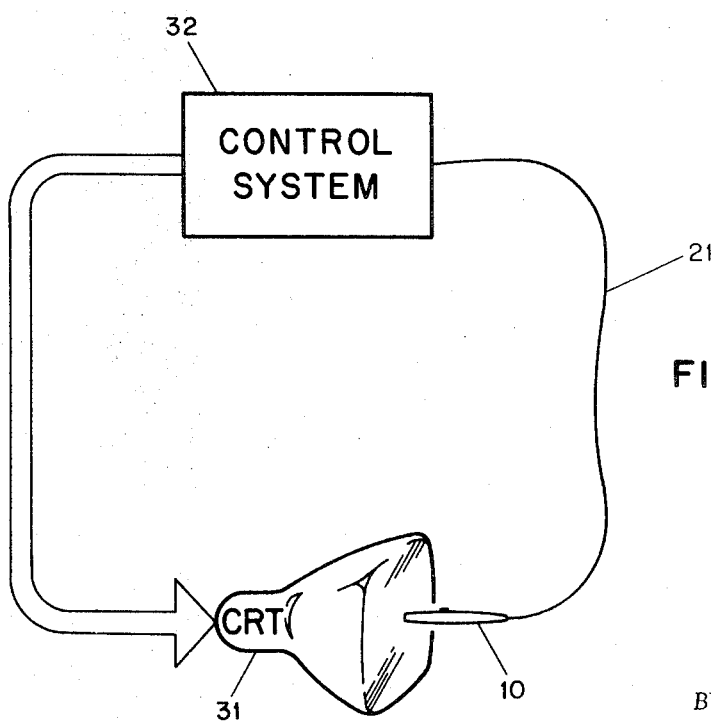
FIG. 2 is a schematic showing of a system which includes the preferred light pen.

Light pens commonly are used in computer-aided design systems, such as the system described in the Massachusetts Institute of Technology report ESL-R-132, "Design of a Remote Display Console," by G. C. Randa, dated Feb. 1962. As shown schematically in FIG. 2, such systems include, in addition to the light pen 10, a cathode-ray tube display device 31 and a control system 32. To define a location on the face of the display device, the control system supplies appropriate electron beam intensity and deflection signals to the display device, causing its electron beam to repetitively cover the face of the tube, scanning in a predefined raster pattern. When the light pen is placed against the face of the tube by the user at the location to be defined for the control system, the resultant burst of light emitted by the internal phosphor coating of the cathode-ray tube when the electron beam passes across the pen's aperture 12 will cause the photosensitive elements 17' and 17'' to produce corresponding electrical signals. The control system correlates the signal or signals produced by these photosensitive elements, with the deflection signals controlling the scanning action to determine the location of the light pen on the face of the display device. The area thereby defined by the light pen will correspond directly to the area viewed by the selected photosensitive element or elements through the aperture defined by the corresponding filter area. Thus, by selecting the photosensitive element or elements which view the field of the desired size through the aperture, either a point or a much larger area may be defined for the control system by the light pen. The element and field of view may be selected manually by the user, by actuating switch 22, or it may be selected automatically by the control system 32 according to the action to be performed. For example, if a point were to be defined by the light pen, the control system would select and respond to the electrical output of photosensitive element 17', whereas if an area were to be erased the control system would preferably respond to the electrical output of both photosensitive element 17' and 17''.

Being able to designate a relatively large area on the display device is particularly useful when displayed information is being modified or erased, for the luminous area defining this information may be covered simply by few fairly sloppy sweeps of the light pen. On the other hand, being able to designate a small area, or point, is also particularly useful when displayed information is being positioned, and when displays are being hand drawn by the user. The disclosed light pen and system provides both of these different designation capabilities.

While a preferred embodiment of the light pen has been disclosed, since different implementations of the invention may be preferred by others, and since modifications will naturally occur to those skilled in this art, the scope of invention should not be interpreted as limited to the illustrated and described embodiment.

I claim:
1. A light pen including:
a housing having an aperture;
means sensitive to electromagnetic radiation mounted within the housing and comprising independent sensitive elements each responsive to a different wavelength of radiation arranged to receive only radiation passing through the aperture; and
means for selectively varying the effective field of view of the sensitive means comprising filter means subtending the aperture and having areas transmitting radiation of different wavelengths corresponding to the wavelength sensitivities of the sensitive elements.
2. A display system including:
a display device for radiating electromagnetic energy from a screen;
light pen means including a housing movable to a position in front of the screen and having an aperture facing the screen;
radiation sensitive means mounted within the housing to receive only radiation passing through the aperture;
means for selectively varying the effective field of view of the radiation sensitive means through the aperture;
control means connected to the display device for causing the display device to radiate sequentially from different areas of the screen; and
means connecting the radiation sensitive means of the light pen to the control means for correlating radiation of the display device with the response of the radiation sensitive means, said control means also including means for automatically setting the field of view varying means to select the field of view of the radiation sensitive means appropriate to the action being performed by the display system.
3. A display system as set forth in claim 2 in which the radiation sensitive means includes a plurality of radiation sensitive elements each responsive to a different wavelength of radiation from the screen, and in which the means for varying the effective field of view includes filter means within the housing, the filter means having filter areas defining different fields of view and transmitting radiation of wavelengths corresponding to the different wavelength sensitivities of the radiation sensitive elements.